United States Patent [19]

Erbes

[11] Patent Number: 5,502,754

[45] Date of Patent: Mar. 26, 1996

[54] LATERAL RESTRAINT FOR CORE PLATE OF BOILING WATER REACTOR

[75] Inventor: John G. Erbes, Mt. View, Calif.

[73] Assignee: General Electric Company, San Jose, Calif.

[21] Appl. No.: 382,748

[22] Filed: Feb. 2, 1995

[51] Int. Cl.⁶ .................................................. G21C 19/00
[52] U.S. Cl. ........................................ 376/302; 376/285
[58] Field of Search .................................. 376/260, 285, 376/287, 302

[56] References Cited

U.S. PATENT DOCUMENTS 5,402,570  4/1995  Weems et al. .................... 29/402.15

FOREIGN PATENT DOCUMENTS 1271594  4/1972  United Kingdom .................. 376/302

OTHER PUBLICATIONS

GE Proposal No. 894–1D7DM–EK1, Revision 1, Core Spray Line Crack Repair, Dec. 9, 1993.
Shroud Repair, Description of Alternatives, Alan N. Baker, Mar. 1994.
Apr. 22, 1994 letter from Al Kozusko & Thomas Sliva of AEA O'Donnell, Inc. to Victor Bain of General Electric Company with annexed Description, facsimile cover sheet and drawings.
Presentation No. 94–004 dated May 2, 1994, by Welding Services Inc. and Structural Integrity Associates, Inc.

*Primary Examiner*—Daniel D. Wasil
*Attorney, Agent, or Firm*—James E. McGinness

[57] ABSTRACT

An apparatus for stabilizing a core plate against lateral deflection. A plurality of core plate wedge assemblies (e.g., four) are installed in the circumferential gap between the circular outer peripheral edge of the core plate and the circular cylindrical wall of the middle shell of the shroud at respective azimuthal positions. These core plate wedge assemblies are wedged into place with preload to maintain the spacing between the core plate and the shroud, thereby maintaining the alignment of the fuel assemblies. The core plate wedge assemblies further serve to transmit loads from the nuclear fuel core to the core shroud at azimuthal locations where lateral shroud restraints outside the shroud contact the reactor pressure vessel.

4 Claims, 4 Drawing Sheets

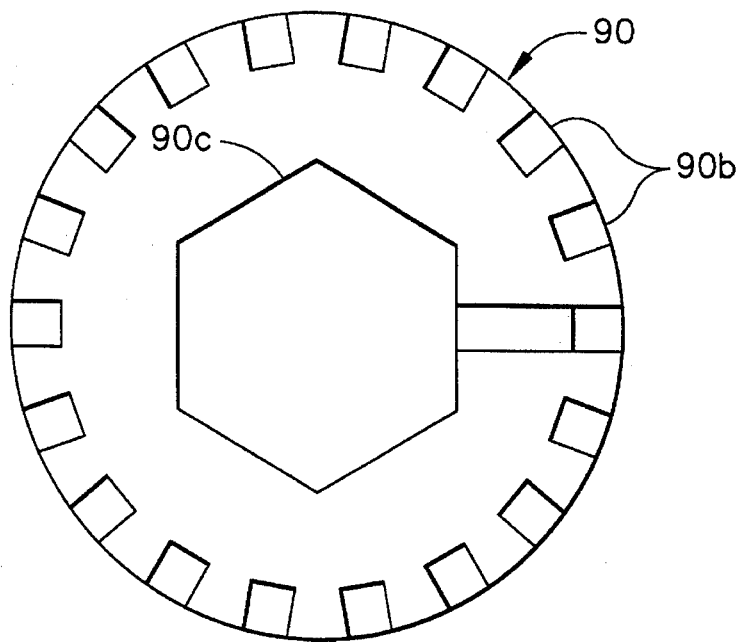
FIG. 5
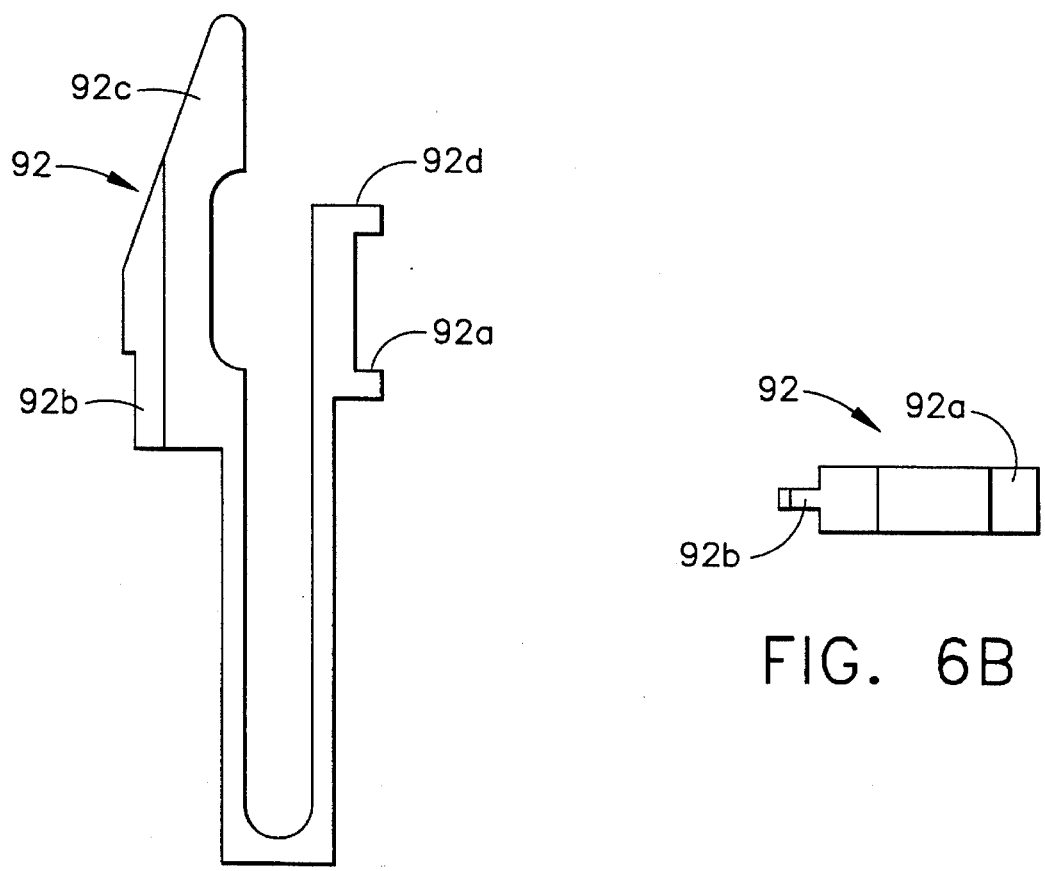
FIG. 6A
FIG. 6B

LATERAL RESTRAINT FOR CORE PLATE OF BOILING WATER REACTOR

FIELD OF THE INVENTION

This invention relates to the design of nuclear reactors able to safely withstand the loads and motions produced during an earthquake. In particular, the invention relates to techniques for stabilizing the core of a nuclear reactor to resist lateral deflection in response to a seismic event.

BACKGROUND OF THE INVENTION

A conventional boiling water reactor is shown in FIG. 1. Feedwater is admitted into a reactor pressure vessel (RPV) 10 via a feedwater inlet 12 and a feedwater sparger 14, which is a ring-shaped pipe having suitable apertures for circumferentially distributing the feedwater inside the RPV. The feedwater from sparger 14 flows downwardly through the downcomer annulus 16, which is an annular region between RPV 10 and core shroud 18.

Core shroud 18 is a stainless steel cylinder surrounding the nuclear fuel core 20. Core 20 is made up of a plurality of fuel bundle assemblies 22 (only two 2×2 arrays of which are shown in FIG. 1). Each array of fuel bundle assemblies is supported at the top by a top guide 19 and at the bottom by a core plate 21. The core top guide provides lateral support for the top of the fuel assemblies; the core plate provides lateral support for the bottom of the fuel assemblies. This lateral support maintains the correct fuel channel spacing to permit control rod insertion.

The water flows through downcomer annulus 16 to the core lower plenum 24. The water subsequently enters the fuel assemblies 22, wherein a boiling boundary layer is established. A mixture of water and steam enters core upper plenum 26 under shroud head 28. Vertical stand-pipes 30 atop shroud head 28 are in fluid communication with core upper plenum 26. The steam-water mixture flows through standpipes 30 and enters steam separators 32, which are of the axial-flow centrifugal type. The separated liquid water then mixes with feedwater in the mixing plenum 33, which mixture then returns to the core via the downcomer annulus. The steam passes through steam dryers 34 and enters steam dome 36. The steam is withdrawn from the RPV via steam outlet 38.

The BWR also includes a coolant recirculation system which provides the forced convection flow through the core necessary to attain the required power density. A portion of the water is sucked from the lower end of the downcomer annulus 16 via recirculation water outlet 43 and forced by a centrifugal recirculation pump (not shown) into jet pump assemblies 42 (only one of which is shown) via recirculation water inlets 45. The BWR has two recirculation pumps, each of which provides the driving flow for a plurality of jet pump assemblies. The jet pump assemblies are circumferentially distributed around the core shroud 18.

The core shroud 18 (see FIG. 2) comprises a shroud head flange 18a for supporting the shroud head 28; a circular cylindrical upper shroud wall 18b having a top end welded to shroud head flange 18a; an annular top guide support ring 18c welded to the bottom end of upper shroud wall 18b; a circular cylindrical middle shroud wall comprising three sections 18d, 18e and 18f welded in series, with a top end of section 18d being welded to top guide support ring 18c; and an annular core plate support ring 18g welded to the bottom end of middle shroud wall section 18f and to the top end of a lower shroud wall 18h. The entire shroud is supported by a shroud support 50, which is welded to the bottom of lower shroud wall 18h, and by annular shroud support plate 52, which is welded at its inner diameter to shroud support 50 and at its outer diameter to RPV 10.

The core plate 21 is bolted to and supported by the support ring 18e. The resulting friction between core plate 21 and support ring 18e resists lateral deflection of the core plate relative to the support ring. However, during reactor operation high-temperature water underneath the core plate exerts an upward pressure. This pressure partly counteracts the force applied by the bolts which clamp core plate 21 to support ring 18e. This decrease in clamping force is accompanied by a decrease in the friction force at the joint formed by the core plate and support ring. As a result of this decrease in friction at the joint, the threshold force needed to cause relative lateral deflection of core plate 21 and support ring 18e is reduced.

In the event of a seismic disturbance, it is conceivable that the ground motion will be translated into lateral deflection of the fuel bundle assemblies 22 seated on the core plate 21 relative to the core shroud 18 and lateral deflection of the core shroud 18 relative to the reactor pressure vessel 10. If not adequately restrained, such deflections could cause unacceptable misalignment and damage to the core and the control rod components, which would adversely affect control rod insertion and safe shutdown.

The shroud can be restrained relative to the reactor pressure vessel using a repair which provides lateral and vertical restraint of shroud deflections. The repair uses spring supports which react seismic loads at localized points around the shroud circumference. For the shroud restraint repair to be effective in controlling core plate deflection, the concentrated restraint loads must be transmitted from the shroud to the core plate without causing sliding in the core plate to shroud joint. Friction in this bolted joint may not be adequate to resist sliding. Thus, there is a need for a device which can restrain the core plate against unacceptably large lateral displacements relative to the core shroud.

SUMMARY OF THE INVENTION

The present invention is an apparatus for restraining a core plate and the fuel assemblies seated thereon against lateral deflection relative to the core shroud. This repair may be used in conjunction with other repairs which restrain the core shroud against lateral and vertical deflection relative to the reactor pressure vessel, particularly in the repair of cracked shroud girth welds. In this case it is desirable that the apparatus for restraining the core plate in accordance with the present invention be azimuthally aligned with the apparatus for restraining the shroud. Typically, three to eight shroud restraint assemblies are required, distributed at equal angular intervals around the shroud periphery and installed between jet pump assemblies.

In accordance with one aspect of the invention, the apparatus restrains a core plate against lateral deflection relative to the shroud. The method involves the placement of a plurality of core plate wedge assemblies (e.g., four) in the circumferential gap between the circular outer peripheral edge of the core plate and the circular cylindrical wall of the middle shell of the shroud at respective azimuthal positions. These core plate wedge assemblies are wedged into place to maintain the spacing between the core plate and the shroud, thereby maintaining the alignment of the fuel assemblies. The core plate wedge assemblies further serve to transmit loads from the nuclear fuel core to the core shroud at locations where lateral shroud restraints contact the shroud. Thus, the core plate wedge assembly in conjunction with the corresponding lateral shroud restraint assembly form a direct path for transmission to the reactor pressure vessel of a load exerted laterally by the core fuel. Depending on the azimuthal direction in which a seismic load is being applied on the fuel core, the load exerted by the shifting fuel core will be transmitted through one or two core plate wedge assemblies at the precise azimuthal positions for lateral restraint of the shroud. Thus, the shroud will not be deformed, as would be the case were the shroud lateral restraint to be applied at an azimuthal position far removed from the azimuthal position where the core plate lateral restraint is applied.

BRIEF DESCRIPTION OF THE DRAWINGS

FIG. 5 is a plan view of the wedge bolt incorporated in the core plate wedge assembly shown in FIGS. 4A and 4B.

FIGS. 6A and 6B are side elevation and bottom plan views, respectively, of the wishbone spring latch incorporated in the core plate wedge assembly shown in FIGS. 4A and 4B.

DETAILED DESCRIPTION OF THE PREFERRED EMBODIMENTS

Figure 1:
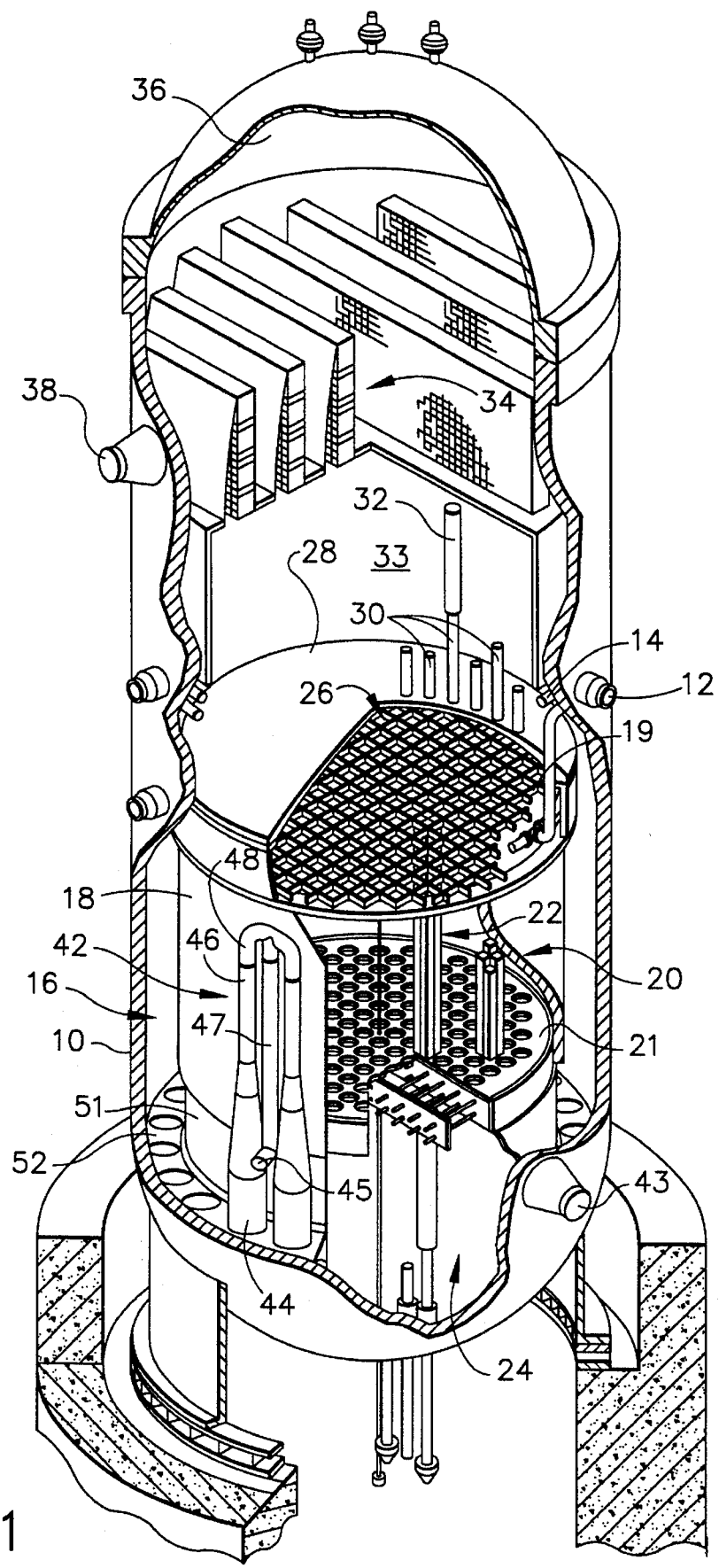
FIG. 1 is a schematic showing a partially cutaway perspective view of a conventional BWR.
Figure 2:
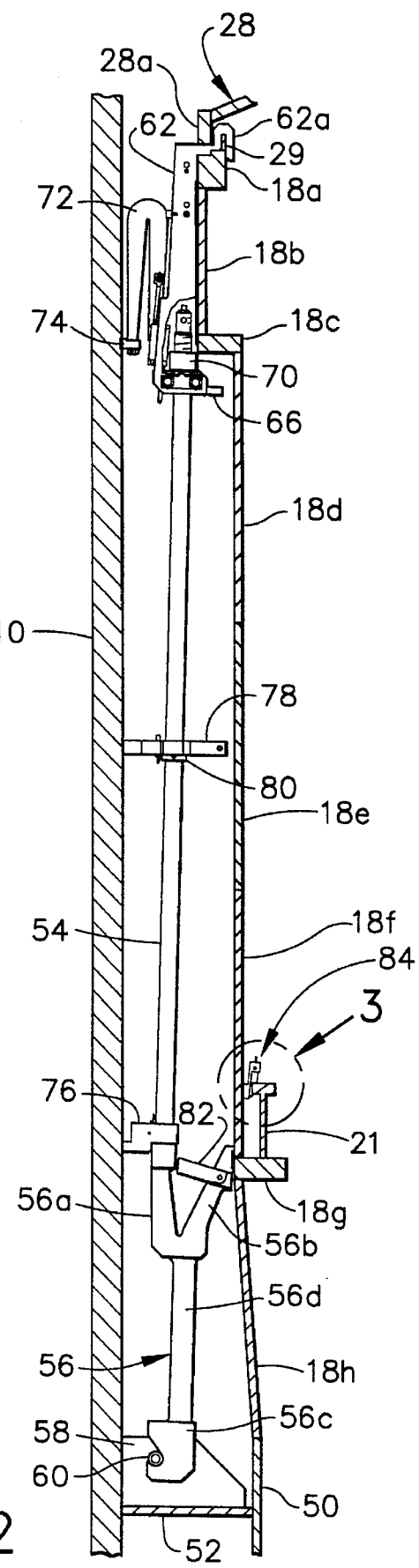
FIG. 2 is an elevation view of a repaired core shroud in accordance with a preferred embodiment of the invention.

The core plate wedge assembly in accordance with the invention may be used in conjunction with a shroud restraint assembly of the type shown in FIG. 2. This shroud restraint assembly comprises a tie rod 54 having a circular cross section. A lower end of tie rod 54 is anchored in a threaded bore formed in the end of a spring arm 56a of a lower spring 56. Tie rod 54 extends from the end of spring arm 56a to a position adjacent the outer circumferential surface of the top guide support ring 18c. The upper end of tie rod 54 has a threaded portion.

The lower spring 56 is anchored to a gusset plate 58 attached to the shroud support plate 52. The gusset is part of the original construction in some reactors, or is otherwise bolted in place as part of the repair. The bottom spring has a slotted end (see FIG. 9) which fits over the gusset plate 58 and forms a pair of clevis hooks 56c. The clevis hooks 56c hook under opposite ends of a clevis pin 60 inserted through a hole machined in the gusset plate 58. Engagement of the slotted end with the gusset plate 58 maintains alignment of lower spring 56 under the action of seismic motion of the shroud, which may be oblique to the spring's radial orientation.

The tie rod 54 is supported at its top end by an upper support assembly which hangs from the top edge of the shroud. In accordance with the installation method of the present invention, a pair of notches or slots are machined in the shroud head ring 28a of shroud head 28. The notches are positioned in alignment with a pair of bolted upper support plate segments 62 of the upper support assembly when the shroud head 28 is properly seated on the top surface of shroud flange 18a. These notches facilitate the coupling of the tie rod assembly to the shroud flange in accordance with the invention, as described in detail hereinafter. The preferred machining technique is electrical discharge machining, although any other suitable machining technique can be used. Machining of these notches may be performed with the shroud head removed from the reactor, avoiding delay of in-reactor outage work. The pair of notches at each tie rod azimuthal position receive respective hook portions 62a of the upper support plates 62. Each hook 62a conforms to the shape of the top surface of shroud flange 18a and the shape of the steam dam 29. The distal end of hook 62a hooks on the inner circumference of shroud dam 29.

The upper support plates 62 are connected in parallel by a top support bracket (not shown) and a support block 66 which forms the anchor point for the top of the tie rod. Support block 66 has an unthreaded bore, tapered at both ends, which receives the upper end of tie rod 54. After the upper end of tie rod 54 has been passed through the support block 66, a threaded tensioning nut 70 is screwed onto the threaded portion of tie rod 54.

The assembly comprised of support plates 62 with hooks 62a, support block 66, tie rod 54, lower spring 56, clevis pin 60 and gusset plate 58 form a vertical load path by which the shroud flange 18a can be anchored to the shroud support plate 52. In the tensioned state, upper support plates 62 exert a restraining force on the top surface of the shroud flange 18a which opposes separation of the shroud at any assumed failed circumferential weld location.

The upper restraint spring 72 is a double cantilever "wishbone" design, to react the lateral seismic loads without adding bending load on the top support. The spring 72 is rotatable relative to the upper support assembly. The end of the outer arm of spring 72 has an upper contact spacer 74 mounted thereon. Upper contact spacer 74 is designed to bear against the inner surface of the reactor pressure vessel wall. The upper spring assembly is installed with enough elastic preload to prevent mechanical wear of its parts due to reactor vibration.

In the event of seismic loading at some oblique angle, the spring 72 can rotate on its axle mounting to absorb the azimuthal motion component, without transmitting oblique loading into the support block 66. Cantilever torsion arms on each side of the upper spring 72 restore the rotational alignment of the spring after seismic deflection. The upper contact spacer 74 which bears against the vessel 10 reacts the restraint load from the vessel and pivots to follow the spring rotation.

The spring arm 56a of lower spring 56 laterally supports the shroud 18 at the core plate 18e, against the vessel 10, via a lower contact spacer 76. The lower spring assembly is installed with a controlled preload, obtained by machining lower contact spacer 76 to match the measured assembly fitup. The top end of spring arm 56a has a threaded bore to provide the attachment for the bottom of the tie rod 54. The member 56d connecting the upper wishbone spring 56a, 56b to the clevis hook 56c is offset from the line of action between the lower end of tie rod 54 and the clevis pin 60. Axial loads in the tie rod therefore cause bending of the lower connecting member 56d and associated pivoting of the clevis hook 56c about the clevis pin 60. The specific configuration is designed to add the desired axial flexibility to the assembly to minimize thermal expansion loads. This flexibility is adjusted along with that of the upper and lower lateral springs to tune the dynamic frequency response of the reactor internal structure to minimize lateral seismic loads.

The lateral seismic loads from the main mass of the reactor core are reacted (for a cracked shroud) by the upper and lower springs at the top guide 18c and core plate 18e, respectively. Gross motion limit stops are also mounted on the stabilizers to limit lateral displacement of other segments of the shroud due to circumferential weld failures. Each upper support block 66 has a limit stop which blocks gross lateral deflection of the middle shroud wall 18d relative to the top guide support ring 18c in the event that the welds between top guide support ring 18c and middle shroud wall 18d become severed. If left unchecked, gross lateral deflection of middle shroud wall 18d could damage peripheral fuel assemblies in the fuel core.

A middle support 78 may be used to provide a limit stop, as shown in FIG. 4, if the middle shroud wall 18d has a circumferential weld in its middle. To facilitate mounting of the middle support 78, a mid-support ring 80 is secured to the tie rod 54. The middle support 78 has a section of an annular recess which form fits on collar 80, thereby preventing lateral shifting of middle support 78 relative to tie rod 54.

The middle support 78 is preloaded against the vessel wall at assembly by radial interference which bends the tie rod 54. Thus it provides both a limit stop for the middle shroud wall 18d, and a mid-span support for the tie rod, improving its resistance to vibratory excitation failure.

Further, each lower spring 56 has a limit stop 82 which blocks gross lateral deflection of the lower shroud wall 18f relative to the core plate support ring 18e in the event that the welds between core plate support ring 18e and lower shroud wall 18f become severed. Gross lateral deflection of lower shroud wall 18f and shroud support 51 welded thereto could, if not checked, cause damage to the control rod guide tubes located underneath the core. Lateral displacement is limited by the radial clearance between arm 56a of lower spring 56 and limit stop 82 mounted on arm 56b of lower spring 56. The gusset 58 limits displacement of the shroud support 50.

The present invention is an apparatus for restraining a core plate, and the fuel assemblies seated thereon, against lateral deflection relative to the core shroud. This repair is preferably used in conjunction with the above-described repairs which restrain the core shroud against lateral and vertical deflection relative to the reactor pressure vessel.

Figure 3:
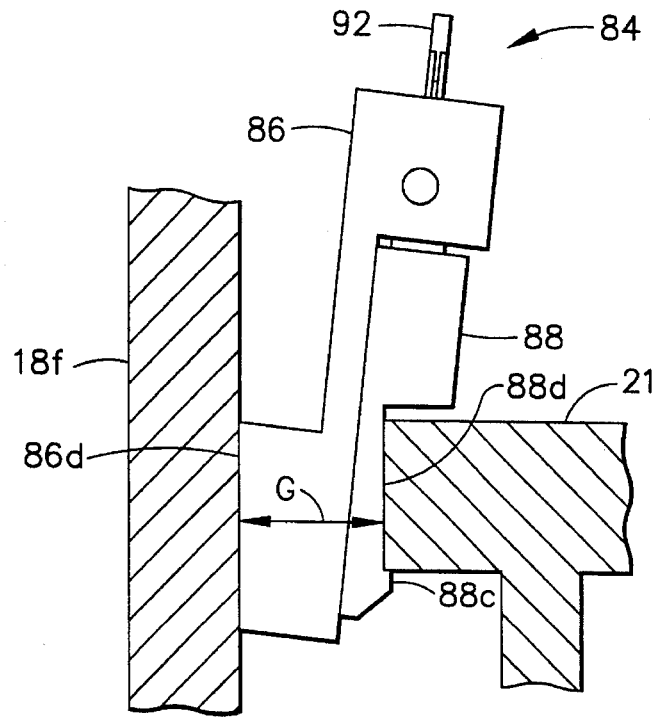
FIG. 3 is a detailed view of the portion of FIG. 2 inside the circle designated 3, showing the core plate wedge assembly in accordance with the preferred embodiment of the invention.

In accordance with the preferred embodiment of the invention depicted in FIG. 3, the core plate 21 is restrained against lateral deflection relative to the middle shroud wall 18d by a core plate wedge assembly 84. The method involves the placement of a plurality of core plate wedge assemblies (e.g., four) in the gap between the circular outer peripheral edge of the core plate and the circular cylindrical inner surface of the middle shroud wall 18d at respective azimuthal positions. These core plate wedge assemblies are wedged into place to maintain the spacing between the core plate and the shroud, thereby maintaining the alignment of the fuel assemblies. The core plate wedge assemblies are preferably located in azimuthal alignment with the shroud restraint assembly. Thus, the core plate wedge assembly in conjunction with the corresponding lateral shroud restraint assembly form a direct path for transmission to the reactor pressure vessel of a load exerted laterally by the fuel core.

Figure 4A:
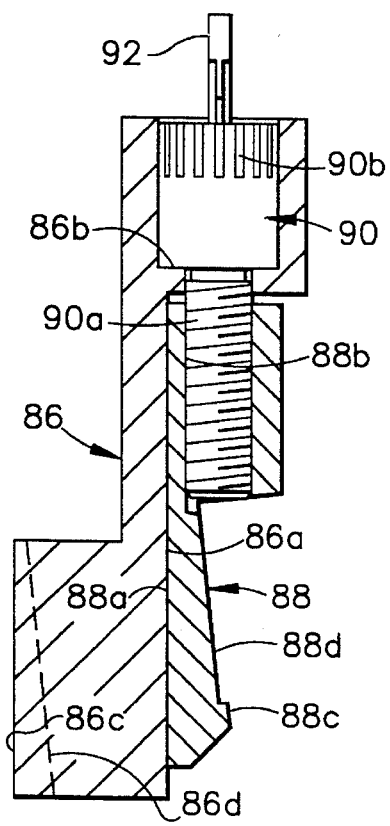
FIGS. 4A and 4B are partly sectioned side and elevation views, respectively, of the core plate wedge assembly in accordance with the preferred embodiment of the invention.
Figure 4B:
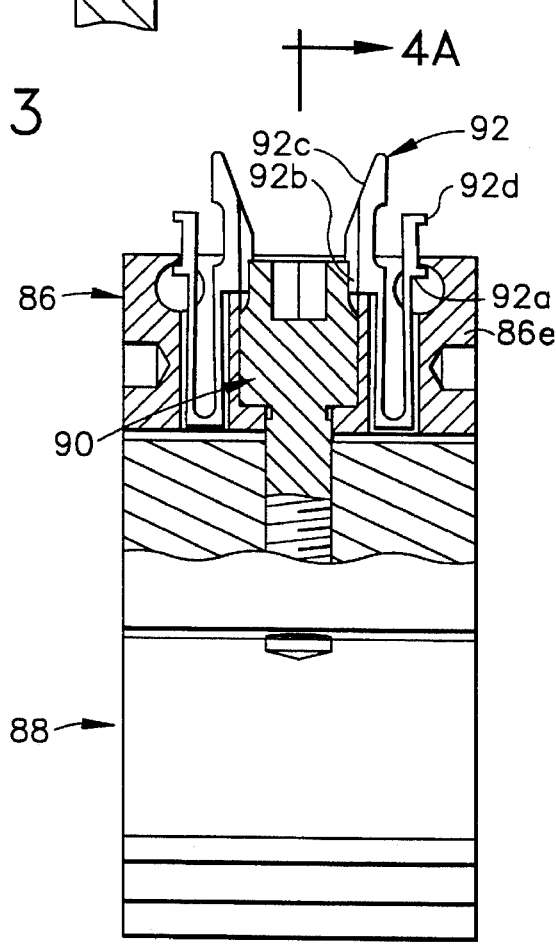

Referring to FIGS. 4A and 4B, the core plate wedge assembly 84 comprises a core plate wedge 86 and a core plate wedge clip 88. The core plate wedge 86 has a planar mating surface 86a and another planar surface 86c parallel thereto. The core plate wedge clip 88 has a planar mating surface 88a and another planar surface 88d which is at an oblique angle (preferably 6°) relative to surface 88a. In the untrimmed state, the surface 86d of core plate wedge 86 is parallel to the 86a.

Prior to assembly of core plate wedge 86 and core plate wedge clip 88, the gap G between the outer circumferential surface of core plate 21 and the inner circumferential surface of the middle shroud wall 18d (see FIG. 3) is measured. Then the core plate wedge 86 is trimmed as shown in FIG. 4A to form a new surface 86d which, when core plate wedge 86 is coupled to core plate wedge clip 88 in its final wedged position, will be parallel to surface 88d and separated therefrom by a distance which increases to approximately G as the bolt is tightened and parts 86 and 88 slide against each other.

To assemble the core plate wedge assembly 84, the mating surface 88a of core plate wedge clip 88 is placed flush against the mating surface 86a of core plate wedge 86 and then a wedge bolt 90 is used to couple the core plate wedge 86 and the core plate wedge clip 88. The core plate wedge 86 has a first unthreaded circular cylindrical bore of first diameter for receiving the circular cylindrical head of wedge bolt 90 and a second unthreaded circular cylindrical bore of second diameter for receiving the threaded shaft 90a of wedge bolt 90. The bore of first diameter communicates with the bore of second diameter at a shoulder 86b. Longitudinal displacement of wedge bolt 90 relative to core plate wedge 86 is prevented by shoulder 86b, while allowing wedge bolt 90 to rotate freely relative to core plate wedge 86. The core plate wedge clip 88 has a threaded bore 88b which threadably engages the threaded shaft 90a as the wedge bolt 90 is screwed in. As the wedge bolt 90 is rotated in the direction of tightening, the core plate wedge clip 88 slides relative to core plate wedge 86 along the bolt axis. To facilitate mutual sliding of mating surfaces 86a and 88a relative to each other, a lubricant may be applied to one or both mating surfaces prior to assembly.

In the initial configuration of the core plate wedge assembly 84, the core plate wedge clip 88 engages only a small portion of the threaded shaft 90a of wedge bolt 90 and occupies an initial axial position relative to core plate wedge 86. In this initial axial position, the distance separating surfaces 86d and 88d is less than the gap G by an amount sufficient to allow the latching projection 88c on core plate wedge clip 88 to pass through the gap. The core plate wedge assembly 84 is then held at an elevation such that when the wedge bolt 90 is tightened, the latching projection 88c will hook underneath the core plate 21, as seen in FIG. 3, as the core plate wedge clip 88 travels axially toward the bolt head. At the same time, the distance separating surfaces 86d and 88d increases. When the distance separating surfaces 86d and 88d equals the gap G, the surface 86d contacts the middle shroud wall 18 and the surface 88d contacts the core plate 21. The wedge bolt 90 can then be tightened until the desired preload is attained. Once the core plate wedge 86 has been trimmed, the amount of preload is a function of the distance which core plate wedge clip 88 travels relative to the core plate wedge. In this state the core plate wedge assembly 84 maintains the spacing G between the core plate and the shroud and transmits a load from the core plate to the shroud. This mounting allows simple installation and subsequent removal, if required for reactor servicing access.

When the desired amount of preload has been attained, the wedge bolt 90 is locked against further rotation relative to the core plate wedge 86 by engagement of a pair of wishbone spring latches 92. As best seen in FIG. 4B, each spring latch 92 has a short leg with a projection 92a that interlocks with the core plate wedge 86 and a long leg with a key 92b that interlocks with one of a multiplicity of longitudinal slots 90b (see FIGS. 4A and 5) formed on the outer circumference of the head of wedge bolt 90. The tip of the long leg of spring latch 92 has a surface 92c which is oblique relative to the leg axis. This oblique surface is contacted by a portion of a tool (not shown) which is used to screw and unscrew the wedge bolt 80. The tool surface bears against the oblique surface, thereby camming the key on the long leg to a position where it will not interfere with the head of the wedge bolt during wedge bolt rotation. As seen in FIG. 5, the head of wedge bolt 90 has an axial recess 90c of hexagonal cross section for receiving a form-fitting portion of the tool to rotate the bolt and transmit preload torque. Only the insertion of the torquing tool is required to disengage the locking latch so that wedge bolt 90 is free to turn.

In addition, the short leg of the spring latch 92 has a projection 92d which can be gripped by a remotely manipulated tool in the event that spring latch 92 must be removed. To remove the spring latch, the short leg must be displaced toward the long leg by an amount sufficient to enable projection 92a to clear the interfering portion 86e of the core plate wedge 86. Two views of the spring latch are presented in FIGS. 6A and 6B.

In accordance with the preferred embodiment, the core plate wedge and core plate wedge clip are made of austenitic stainless steel (e.g., Type 316). The wedge bolt and associated spring latch are made of Ni-Cr-Fe alloy X-750. Both are specified and fabricated with controls to assure maximum corrosion resistance in the BWR environment.

In accordance with the preferred arrangement, four core plate wedge assemblies are installed at respective azimuthal positions distributed at angular intervals around the core plate circumference. However, the concept of the invention is directed to the installation of three or more core plate wedge assemblies and is expressly not limited to an arrangement of four.

The preferred embodiment of the core plate wedge assembly in accordance with the invention has been disclosed for the purpose of illustration. Variations and modifications of the disclosed structure which fall within the concept of this invention will be readily apparent to persons skilled in the art of mechanical engineering in the boiling water reactor environment. All such variations and modifications are intended to be encompassed by the claims set forth hereinafter.

I claim:

1. A method for stabilizing the core fuel of a light water reactor of the type having a multiplicity of fuel assemblies supported by a core plate attached along its periphery to a core shroud support ring of a shroud concentrically arranged inside a reactor pressure vessel, comprising the steps of installing first, second and third spacers between an outer circumferential surface of the core plate and an inner circumferential surface of the shroud, said first, second and third spacers being wedged with preload between said circumferential surfaces at first, second and third azimuthal positions respectively.

2. The method as defined in claim 1, further comprising the steps of installing a fourth spacer between said circumferential surfaces, said fourth spacer being wedged with preload between said circumferential surfaces at a fourth azimuthal positions, said first through fourth azimuthal positions being spaced at about 90 degrees.

3. The method as defined in claim 1, wherein radial preload is applied by sliding said first spacer relative to said second spacer along a line disposed at an oblique angle relative to a centerline axis of said shroud.

4. The method as defined in claim 3, wherein said sliding occurs in response to rotation of a remotely manipulated tool.

\* \* \* \* \*